US012737502B2

(12) United States Patent
Yan et al.

(10) Patent No.: US 12,737,502 B2
(45) Date of Patent: Sep. 15, 2026

(54) REMOTE SENSING IMAGE SECURITY RETRIEVAL METHOD AND SYSTEM IN CLOUD ENVIRONMENT

(71) Applicants: LANZHOU JIAOTONG UNIVERSITY, Lanzhou (CN); GANSU DAYU JIUZHOU SPACE INFORMATION TECHNOLOGY CO., LTD., Lanzhou (CN)

(72) Inventors: Haowen Yan, Lanzhou (CN); Liming Zhang, Lanzhou (CN); Zhaoyang Hou, Lanzhou (CN); Shuwen Yang, Lanzhou (CN); Weifang Yang, Lanzhou (CN); Ting Yang, Lanzhou (CN)

(73) Assignees: LANZHOU JIAOTONG UNIVERSITY, Lanzhou (CN); GANSU DAYU JIUZHOU SPACE INFORMATION TECHNOLOGY CO., LTD., Lanzhou (CN)

( * ) Notice: Subject to any disclaimer, the term of this patent is extended or adjusted under 35 U.S.C. 154(b) by 0 days.

(21) Appl. No.: 19/258,655

(22) Filed: Jul. 2, 2025

(65) Prior Publication Data

US 2026/0017414 A1 Jan. 15, 2026

(30) Foreign Application Priority Data

Jul. 13, 2024 (CN) ......................... 202410938537.6

(51) Int. Cl.
*G06F 21/16* (2013.01)
*G06F 21/31* (2013.01)
(Continued)

(52) U.S. Cl.
CPC .............. *G06F 21/64* (2013.01); *G06F 21/16* (2013.01); *G06F 21/31* (2013.01); *G06V 10/44* (2022.01);
(Continued)

(58) Field of Classification Search
CPC .......... G06F 21/64; G06F 21/16; G06F 21/31; G06F 16/5866; G06F 16/51;
(Continued)

(56) References Cited

U.S. PATENT DOCUMENTS

2018/0260565 A1* 9/2018 Wang ................. H04L 63/1483

FOREIGN PATENT DOCUMENTS

CN 106599311 A 4/2017
CN 107480163 A 12/2017
(Continued)

OTHER PUBLICATIONS

A Privacy-Preserving and Copy-Deterrence Content-Based Image Retrieval Scheme in Cloud Computing, Xia et al, Sep. 2016 (Year: 2016).*

*Primary Examiner* — Jahangir Kabir
(74) *Attorney, Agent, or Firm* — Ming Jiang; OPENPTO US LLC

(57) ABSTRACT

The disclosure discloses a remote sensing image security retrieval method and a remote sensing image security retrieval system in cloud environment. According to the present disclosure, a CNN model is applied to extract features, then dimension reduction is performed according to spectral hashing with spectral rotation, and clustering is performed through K-means++. A secure encryption searchable index is generated from the correction tuple of Asymmetric Scalar-Product-Preserving Encryption (ASPE). Image encryption is performed after creating watermark embedding space through prediction error marking and pixel rearrangement. The copyright information and the user information are flexibly embedded and extracted in the process for copyright authentication and distribution data tracking. In addition, the authenticity of the search result is verified by constructing the Merkle tree.

7 Claims, 1 Drawing Sheet

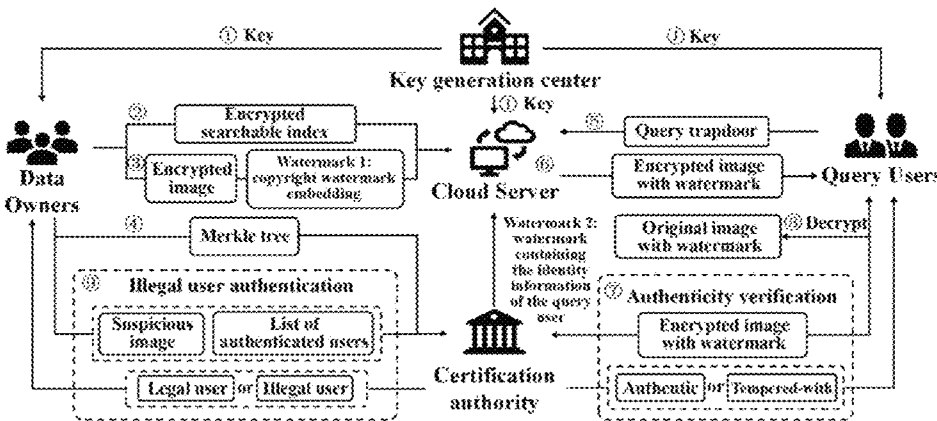

(51) Int. Cl.

| | |
|---|---|
| ***G06F 21/64*** | (2013.01) |
| ***G06V 10/44*** | (2022.01) |
| ***G06V 10/762*** | (2022.01) |
| ***G06V 10/82*** | (2022.01) |
| ***H04L 9/32*** | (2006.01) |

(52) U.S. Cl.
CPC ............ *G06V 10/762* (2022.01); *G06V 10/82* (2022.01); *H04L 9/3236* (2013.01); *H04L 2209/608* (2013.01)

(58) Field of Classification Search
CPC . H04L 9/3236; H04L 2209/608; G06V 10/44; G06V 10/762; G06V 10/82; G06V 10/454; G06V 10/7715; G06V 10/774; G06N 3/0464; G06N 3/096; Y02D 10/00; H04N 1/4406
USPC .......................................................... 713/176
See application file for complete search history.

(56) References Cited

FOREIGN PATENT DOCUMENTS

| | | | | |
|---|---|---|---|---|
| CN | 112883403 A | * | 6/2021 | ............. G06F 18/22 |
| CN | 113569280 A | | 10/2021 | |
| WO | 2022217926 A1 | | 10/2022 | |

* cited by examiner

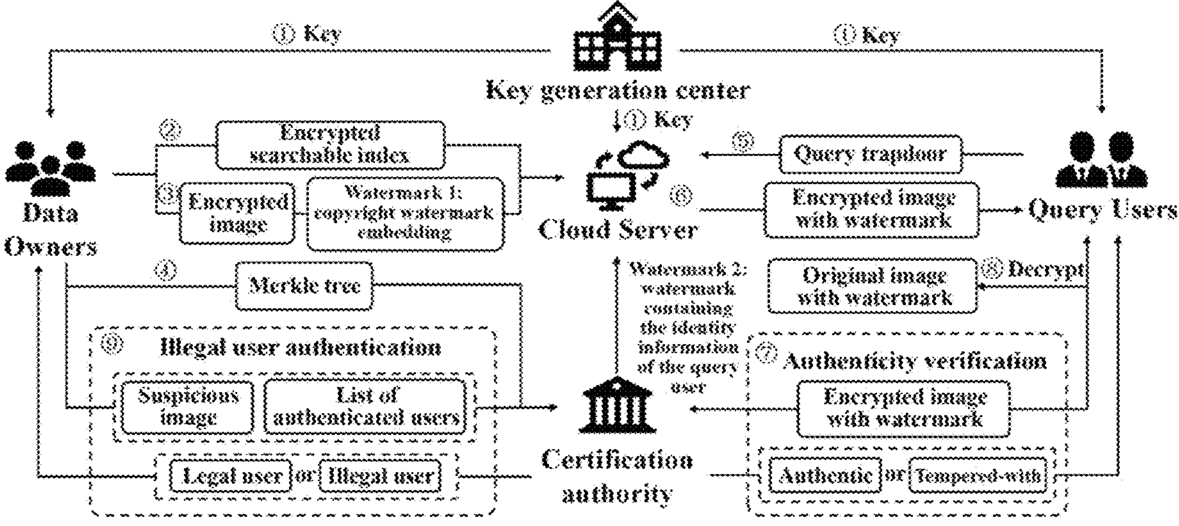
① Key
① Key
Key generation center
① Key
Data Owners
② Encrypted searchable index
③ Encrypted image
Watermark 1: copyright watermark embedding
Cloud Server
⑤ Query trapdoor
⑥ Encrypted image with watermark
Query Users
④ Merkle tree
Watermark 2: watermark containing the identity information of the query user
Original image with watermark
⑧ Decrypt
⑨ Illegal user authentication
Suspicious image
List of authenticated users
Legal user
or
Illegal user
Certification authority
⑦ Authenticity verification
Encrypted image with watermark
Authentic
or
Tempered-with
⑥ The cloud server searches the encrypted searchable index, embeds Watermark 2 in the retrieved image and sends it to the query user.

REMOTE SENSING IMAGE SECURITY RETRIEVAL METHOD AND SYSTEM IN CLOUD ENVIRONMENT

TECHNICAL FIELD

The disclosure belongs to the technical field of spatial data security, and in particular to a remote sensing image security retrieval method and a remote sensing image security retrieval system in cloud environment.

BACKGROUND

With the continuous advancement of Earth observation technology, remote sensing imagery has also experienced rapid growth. Particularly with the support of distributed storage and high-performance parallel computing, the era of big data in remote sensing has been further propelled. To address the storage, management, and application challenges posed by the rapid growth of remote sensing imagery, cloud computing offers a potential solution due to its scalability, massive storage capabilities, and affordability. The rapid development and widespread adoption of the Internet are accompanied by threats to information security. Remote sensing images containing critical information must undergo encryption processing to ensure their confidentiality before being outsourced to the cloud. However, secure image retrieval necessitates a balance between searchability and confidentiality, while commonly suffering from issues such as low retrieval accuracy and efficiency, thereby failing to meet the requirements for large-scale image retrieval in cloud environments. Meanwhile, "semi-honest" cloud servers, malicious external attackers, and self-interested query users may engage in activities such as data leakage and content forgery for illicit gains, thereby posing severe threats to secure image retrieval systems.

By summarizing the existing technology, there are at least the following technical problems:

First, when multiple data owners are involved, the remote sensing images held by different owners are limited and exhibit significant disparities, creating challenges for supporting large-scale training and guaranteeing feature extraction within an identical feature space. In addition, the high-dimensional features obtained through deep learning require substantial storage and computational resources.

Second, the conventional approaches contemplate employing homomorphic encryption and secure multi-party computation techniques to encrypt image features. However, for remote sensing images characterized by massive data volume and rich content, these methods fail to achieve an optimal balance among retrieval efficiency, accuracy, and security in secure image retrieval systems.

Third, the prior art contemplates employing watermarking technology to trace data distributed to query users, wherein the process seldom considers the reversibility and separability of image encryption and watermark embedding, consequently failing to satisfy both the high-fidelity requirements for remote sensing images and the flexibility demands for multi-task remote sensing image retrieval.

Forth, the prior art universally defines cloud servers as honest, while in practical applications cloud servers operate under a "semi-honest" model potentially engaging in data content falsification and tampering activities, consequently returning inauthentic remote sensing images and severely negatively impacting earth observation and survey tasks.

SUMMARY

To address the issues in existing secure image retrieval technologies concerning retrieval efficiency and accuracy, image content security, retrieval process privacy, data distribution legality, and retrieval result authenticity, the present invention proposes a remote sensing image security retrieval method and a remote sensing image security retrieval system in cloud environment. According to the disclosure, the image owner uploads the encrypted image and the encrypted searchable index to the cloud server, the query user generates a query trapdoor and sends it to the cloud server, after receiving the query request, the cloud server performs secure retrieval; then the certification authority verifies the authenticity of the retrieval result and the distribution legality, thereby ultimately achieving the secure and efficient retrieval performance and the authentic retrieval result.

In order to achieve the above purpose, following technical schemes are adopted by the disclosure:

the remote sensing image security retrieval method in cloud environment, including:

S1, constructing, by the image owner, an encrypted searchable index and a Merkle tree for outsourced images while encrypting the image set, transmitting an encrypted image set and the encrypted searchable index to a cloud server, and sending the Merkle tree to a certification authority;

S2, extracting and encrypting, by the query user, the query image features in the same manner, generating a query trapdoor, and then transmitting the query trapdoor to the cloud server, and verifying the authenticity of the search results through the certification authority upon receiving returned retrieval results;

S3, storing, by the cloud server, the outsourced images and the encrypted searchable index of the image owner, retrieving encrypted images according to the query trapdoor provided by the query user, returning a Top-k encrypted image structurally similar to the query image, and embedding specific watermarks generated by the certification authority for each user into retrieved encrypted images; and S4, performing, by the certification authority, both user authentication and retrieval result correctness verification tasks, executing the user authentication by generating specific watermarks for each user to control illegal distribution of retrieved images, and implementing the retrieval result correctness verification through the Merkle tree.

Optionally, in the S1, a construction method of the encrypted searchable index is as follows:

S21, extracting a feature vector of each image by using a pre-trained CNN model;

S22, converting high-dimensional feature vectors into low-dimensional binary codes according to spectral hashing with spectral rotation, and performing K-means++ clustering; and S23, expanding the feature vector after dimensionality reduction and clustering, and splitting into two parts, and encrypting the two parts obtained by splitting respectively according to two random matrices.

Optionally, in the S1 and the S3, the image set encryption and watermark embedding methods are as follows:

S31, performing prediction error marking and pixel rearrangement to create watermark embedding space;

S32, generating a pseudo-random matrix by a pseudo-random generator, binarizing the current pixel, and performing bitwise XOR encryption; and S33, extracting starting position information for data embedding in each image according to a data concealer, and then embedding the watermark in the space vacated by the encrypted image in the form of pixel replacement after the starting position.

Optionally, in the S2, the query trapdoor generation is to expand the query vector and split the query vector into two parts, and then encrypting the two parts according to two random matrices, where the two random matrices and the two random matrices in S23 are reciprocal quantities.

Optionally, in the S4, the authenticity verification of the retrieval result by the certification authority is as follows:

S51, returning, by the certification authority, all adjacent nodes along the path from the root node to the leaf node for the image to be verified as evidence according to the Merkle tree of the image set; and S52, constructing a new Merkle tree according to the image to be verified and its evidence, and comparing the root hash values of the new Merkle tree with the root hash values of the original Merkle tree.

Optionally, in the S4, the tracking of the distribution data by the certification authority is as follows:

S61, identifying, by the image owner, suspicious images and transmitting both duplicate copies and original images to the certification authority; and S62, locating, by the certification authority, the reserved watermark-embedded space by extracting the starting position marker, and recovering the embedded watermark information.

A remote sensing image security retrieval system in cloud environment, including, a retrieval index generation and encryption module, configured for the image owner to extract low-dimensional image features and encrypt a feature vector to form an encrypted feature vector, and send the encrypted feature vector to the cloud server;

an image encryption and watermark embedding module, configured to encrypt the image of the reserved space and track the watermark embedding of the distribution data, send the encrypted image to the cloud server, and embed the watermark containing the identity information of the query user into the encrypted image by the cloud server;

a query vector generation and encryption module, configured for the query user to extract image features and encrypt the query vector to form an encrypted query vector, and send the encrypted query vector to the cloud server;

a retrieval module, configured to calculate the Euclidean distances between the encrypted feature vector and the encrypted query vector, and return Top-k encrypted images sorted in ascending order;

a retrieval result authenticity verification module, configured to prevent malicious cloud servers and external attackers from forging and tampering with image content; and a data distribution legitimacy verification module, configured to track distributed data and prevent malicious query users from leaking the retrieval result.

Compared with the prior art, the disclosure has the following beneficial technical effects:

Using transfer learning with a pre-trained CNN model to extract features and performing dimensionality reduction based on spectral hashing with spectral rotation allows for high-precision and high-efficiency retrieval of features from different source images in the same feature space. By encrypting image features with the corrected tuples according to Asymmetric Scalar-Product-Preserving Encryption (ASPE), a secure encrypted searchable index is generated, achieving privacy protection for feature operations. In addition, the reversibility and separability of image encryption and watermark embedding meet the requirements of high fidelity of high-precision remote sensing images and flexibility of secure image retrieval, thus effectively controlling and tracking the illegal distribution of retrieved images. By constructing Merkle tree to authenticate the authenticity of retrieval results, the behavior of forging and tampering with data content is curbed.

BRIEF DESCRIPTION OF THE DRAWING

In order to explain the embodiment of the present invention or the technical scheme in the prior art more clearly, a drawing needed to be used in the description of the embodiment or the prior art will be briefly introduced below. Obviously, one drawing in the following description is only an embodiment of the present invention, and other drawings can be obtained by ordinary people in the field without paying creative labor.

FIG. 1 is an overall framework diagram of a remote sensing image security retrieval method and a remote sensing image security retrieval system in cloud environment provided by the present disclosure.

DETAILED DESCRIPTION OF THE EMBODIMENTS

In the following, the technical scheme in the embodiment of the disclosure will be clearly and completely described with reference to the attached drawings. Obviously, the described embodiment is only a part of the embodiment of the disclosure, but not the whole embodiment. Based on the embodiments in the present disclosure, all other embodiments obtained by ordinary technicians in the field without creative labor belong to the scope of protection of the present disclosure.

Referring to FIG. 1, the embodiment of the disclosure discloses a remote sensing image security retrieval method and a remote sensing image security retrieval system in cloud environment, includes the following steps:

Step 1, the key generation center generates the key needed for the encryption algorithm.

Generating a key by using a key generation algorithm:

Firstly, randomly generating a binary vector G and two invertible matrices $M_1$ and $M_2$; then, for the image owner, randomly generating four invertible matrices, including $A_{\theta1,1}$, $A_{\theta1,2}$, $B_{\theta1,1}$, $B_{\theta1,2} \in \mathbb{R}_\eta^{(d+1)\times(d+1)}$, where, $A_{\theta1,1} \cdot A_{\theta1,2} = M_1$, $B_{\theta1,1} \cdot B_{\theta1,2} = M_2$; for the query user, randomly generating four invertible matrices $A_{\theta2,1}$, $A_{\theta2,2}$, $B_{\theta2,1}$, $B_{\theta2,2} \in \mathbb{R}_\eta^{(d+1)\times(d+1)}$, where $$A_{\theta1,1} \cdot A_{\theta1,2} = M_1^{-1},\ B_{\theta2,2} \cdot B_{\theta2,1} = M_2^{-1},$$

$\mathbb{R}_\eta$ is an η-bit coded real set. $K_{l,i}$ represents the key required to encrypt the image using the stream cipher.

Step 2, the image owner builds an encrypted searchable index.

First, extracting, by the image owner, a set of feature vectors $F_i=\{f_{1,t}, f_{1,2}, \ldots, f_{1,n}\}$ from the image set using a CNN model and applying dimensionality reduction via spectral hashing with spectral rotation, followed by clustering $F_i=\{f_{1,t}, f_{1,2}, \ldots, f_{1,n}\}$ into $C_i=\{c_{i,1}, c_{i,2}, \ldots, c_{i,k}\}$ using K-means++.

Second, for each feature vector $f_t$, $1 \le t \le n$, and adding $\|f_t\|^2$ to $f_t$ to expand the feature vector $f_t$ into the (d+1) dimension.

Third, when the binary vector G is equal to 0, assigning $f_{t,a}=f_{t,b}=f_t$, otherwise $f_{t,a}+f_{t,b}=f_t$, and dividing $f_t$ into two vectors $f_{t,a}$ and $f_{t,b}$; then, encrypting each extended feature vector $f_t$ into $f_t'=(f_{t,a}A_{\theta 1,1}, f_{t,b}B_{\theta 1,1})$ according to the random matrix $A_{\theta 1,1}$, $B_{\theta 1,1}$.

Forth, similarly, encrypting the cluster center $c_s$ into $$c_s',$$

where $1 \le s \le k$, to obtain the encrypted feature vector $$F_i' = \{f_{i,1}', f_{i,2}', \ldots , f_{i,n}'\}$$

and the encrypted cluster centers $$C_i' = \{c_{i,1}', c_{i,2}', \ldots , c_{i,k}'\}.$$

Step 3, the image owner encrypts the image set.

Carrying out prediction error marking, pixel rearrangement, and image encryption in turn by the image owner, where the encryption algorithm is stream cipher encryption, that is, first, a pseudo-random matrix R of size m×n is generated by a pseudo-random generator, and then the current pixels x(i,j) and r(i,j) are binarized into $x^k(i,j)$ and $r^k(i,j)$, followed by bitwise XOR encryption; then, the image owner extracts the starting position information for data embedding in each image, and then embeds the watermark containing copyright information into the reserved space of the encrypted image in the form of pixel replacement after the starting position; finally, an encrypted image set marked with copyright information is generated; the details of the ciphertext domain watermark embedding algorithm are referred to as "Reversible data hiding in encrypted images based on pixel prediction and multi-MSB planes rearrangement" (Signal Processing 187 (2021): 108146).

Step 4, the image owner builds a Merkle tree.

Performing, by the image owner, hash calculations on each encrypted image $$m_{i,t}'$$

and its corresponding ID to obtain leaf nodes $$N_{i,t} = h(m_{i,t}' \| ID(m_{i,t}')),$$

then sequentially deriving internal nodes and the root node based on the computed leaf nodes to generate a Merkle tree.

Step 5, the query trapdoor is generated by the query user.

First, extracting, by the query user, the feature vector $f_q$ from the query image using the same method.

Second, multiplying $f_q$ by (−2) and adding 1 to the end of the vector to obtain a (d+1)-dimensional query vector.

Third, when the binary vector G equals 0, assigning $f_{q,a}=f_{q,b}=f_q$; otherwise $f_{q,a}+f_{q,b}=f_q$, and splitting $f_q$ into two vectors $f_{q,a}$ and $f_{q,b}$.

Forth, encrypting each expanded feature vector $f_q$ into $$f_q' = (\gamma A_{\theta 2,1} f_{q,a}^T, \gamma B_{\theta 2,1} f_{q,b}^T)$$

using random matrices $A_{\theta 2,1}$ and $B_{\theta 2,1}$, where $\gamma$ is a random positive integer ensuring the randomness and security of the query trapdoor.

Step 6, the cloud server retrieves the image set and returns the retrieval result to the query user.

First, transforming each encrypted feature vector $$f_t'$$

into $\tilde{f}_t=(\tilde{f}_{t,a},\tilde{f}_{t,b})$ according to $A_{\theta 1,2}$ and $B_{\theta 1,2}$, that is, $\tilde{f}_{t,a}=(f_{t,a}A_{\theta 1,1})\cdot A_{\theta 1,2}$, $\tilde{f}_{t,b}=(f_{t,b}B_{\theta 1,1})\cdot B_{\theta 1,2}$.

Second, transforming the query trapdoor $f_q'$ into $\tilde{f}_q=(\tilde{f}_{q,a}, \tilde{f}_{q,b})$ according to $A_{\theta 2,2}$ and $B_{\theta 2,2}$, that is, $$\tilde{f}_{q,a} = A_{\theta 2,2} \cdot (\gamma A_{\theta 2,1} f_{q,a}^T),\ \tilde{f}_{t,b} = B_{\theta 2,2} \cdot (\gamma B_{\theta 2,1} f_{q,b}^T).$$

Third, calculating, by the cloud server, the Euclidean distance $HD_t$ between $f_t$ and $f_q$ based on the index vector $\tilde{f}_t=(\tilde{f}_{t,a},\tilde{f}_{t,b})$ and the query vector $\tilde{f}_q=(\tilde{f}_{q,a},\tilde{f}_{q,b})$, that is, $$HD_t = \frac{\tilde{f}_t \cdot \tilde{f}_q}{\gamma} = \left(\frac{\tilde{f}_{t,a} \cdot \tilde{f}_{q,a}}{\gamma}, \frac{\tilde{f}_{t,b} \cdot \tilde{f}_{q,b}}{\gamma}\right) = \left(\frac{(f_{t,a}A_{\theta 1,1}) \cdot A_{\theta 1,2} \cdot A_{\theta 2,2} \cdot (\gamma A_{\theta 2,1} f_{q,a}^T)}{\gamma}, \frac{(f_{t,b}B_{\theta 1,1}) \cdot B_{\theta 1,2} \cdot B_{\theta 2,2} \cdot (\gamma B_{\theta 2,1} f_{q,b}^T)}{\gamma}\right) = \left(\frac{\gamma f_{t,a} M_1 M_1^{-1} f_{q,a}^T}{\gamma}, \frac{\gamma f_{t,b} M_2 M_2^{-1} f_{q,b}^T}{\gamma}\right) = (f_{t,a} f_{q,a}^T, f_{t,b} f_{q,b}^T) = f_t f_q^T,$$

and returning the Top-k encrypted image according to the distance size sequence.

Forth, after obtaining the Top-k encrypted image, embedding, by the cloud server, the watermark containing the identity information of the query user therein, and sending the encrypted image containing the user authentication watermark information to the query user.

Step 7: the certification authority verify the authenticity of the retrieval result.

First, finding, by the certification authority, the reserved space embedded with the user authentication watermark by extracting the start position marker, and extracting the embedded watermark containing the query user identity information, so as to obtain the encrypted image without user authentication watermark.

Second, for the Top-k encrypted image $$m_{i,n}',$$

generating the evidence $\pi_{i,n}$ by the certification authority according to the Merkle tree.

Third, first performing a hash calculation on the encrypted image to obtain leaf node $$N_{i,n} = h(m_{i,n}' \| ID(m_{i,n}'));$$

then constructing a Merkle tree based on the evidence $\pi_{i,n}$ to derive root node hash value $$N'_{root};$$

finally, verifying whether $$N'_{root}$$

equals $N_{root}$, where $N_{root}$ is the root node hash value of the Merkle tree, if equal, the encrypted image $$m'_{i,n}$$

is authenticated, otherwise, tampering is detected.

Step 8, the query user decrypts the retrieved image.

Decrypting the encrypted image $$m'_{i,n}$$

using the key $K_{I,i}$, extracting the auxiliary information preceding the start position marker to obtain the ignore bits, threshold T, label list, and compressed location map. Decompressing the location map and, based on the auxiliary information, restoring all original pixel values according to the label and predicted value of each pixel, thereby losslessly recovering the original image $m_{i,n}$.

Step 9, watermark extraction.

Two watermark extraction are included herein, which are watermark extraction for copyright protection and watermark extraction for user authentication, respectively. The former is completed by the image owner, and the embedded copyright information watermark is extracted to realize copyright protection of the image set. The latter is done by the certification authority to extract the legitimacy of the embedded user authentication watermark to authenticate the identity of the suspicious object. The reserved space embedded with the user authentication watermark is found by extracting the start position marker, and the embedded watermark information is extracted.

Compared with the prior art, the disclosure has the following advantages:

Firstly, in order to improve the accuracy and efficiency of image retrieval on the basis that the image features extracted by different image owners have the same feature space, the proposal scheme uses CNN transfer learning to extract the feature vector of each image before image encryption, then converts the high-dimensional feature vector into a low-dimensional binary code according to spectral hashing with spectral rotation, and performs K-means++ clustering to divide the feature vector into meaningful clusters, so that the storage and communication costs are reduced while higher retrieval precision is maintained.

Secondly, each cluster center is encrypted according to a correction tuple encryption algorithm of the ASPE, to generate a secure encrypted searchable index, to implement privacy protection of the feature operation.

Thirdly, the prediction error marking and the pixel rearrangement operation are performed before the image is encrypted, and the auxiliary information required for the complete recovery of the image is stored therein, thereby ensuring the reversibility of the watermark embedding of the ciphertext domain. The prediction error is marked by using statistical characteristics of Laplace distribution, so as to vacate more watermark-embedded space. It should be noted that watermark extraction and image recovery are independent from each other, thereby improving the flexibility of privacy protection for security image retrieval.

Fourthly, a Merkle tree is constructed according to the encrypted image set to suppress counterfeiting and tampering of the image content, and a verifiable and trusted Top-k retrieval result is obtained under the condition that a malicious cloud server and an external attacker exist.

Each embodiment in this specification is described in a progressive way, and each embodiment focuses on the differences from other embodiments, so it is only necessary to refer to the same and similar parts between each embodiment. As for the device disclosed in the embodiment, because it corresponds to the method disclosed in the embodiment, the description is relatively simple, and the relevant points can only be described in the method part.

The above description of the disclosed embodiments enables those skilled in the art to make or use the disclosure. Many modifications to these embodiments will be obvious to those skilled in the art, and the general principles defined herein can be implemented in other embodiments without departing from the spirit or scope of the disclosure. Therefore, the present disclosure is not to be limited to the embodiments shown herein, but is to be accorded the widest scope consistent with the principles and novel features disclosed herein.

What is claimed is:

1. A remote sensing image security retrieval method in cloud environment, comprising:

utilizing, by an image owner, a pre-trained convolutional neural network (CNN) model to extract features from outsourced images as an image set, generating an encrypted searchable index based on spectral hashing with spectral rotation for dimensionality reduction and asymmetric scalar-product-preserving encryption (ASPE), carrying out prediction error marking and pixel rearrangement to create space for watermark embedding, encrypting the image set after the prediction error marking and the pixel rearrangement to obtain an encrypted image set and constructing a Merkle tree, transmitting the encrypted image set and the encrypted searchable index to a cloud server, and sending the Merkle tree to a certification authority;

wherein the generating an encrypted searchable index based on spectral hashing with spectral rotation for dimensionality reduction and ASPE comprises:

extracting, by the image owner, a set of feature vectors from the image set by using the pre-trained CNN model;

performing dimensionality reduction on the set of feature vectors via the spectral hashing with spectral rotation to obtain a set of dimension-reduced feature vectors, and performing K-means++clustering on the set of dimension-reduced feature vectors to obtain a set of cluster vectors; and expanding each cluster vector in the set of cluster vectors, followed by splitting into two parts, and encrypting the two parts obtained by splitting respectively according to two random matrices;

wherein the carrying out prediction error marking and pixel rearrangement to create space for watermark embedding and the encrypting the image set after the prediction error marking and the pixel rearrangement to obtain an encrypted image set comprise:

performing the prediction error marking and the pixel rearrangement on each image in the image set to create a watermark embedding space;

generating a pseudo-random matrix by a pseudo-random generator, and binarizing a current pixel in each image, followed by performing bitwise XOR encryption; and extracting starting position information for data embedding in each image, and then embedding a watermark containing copyright information into the watermark embedding space vacated by a corresponding encrypted image in the encrypted image set in a form of pixel replacement after a starting position;

utilizing, by a query user, the pre-trained CNN model to extract features from a query image, generating a query trapdoor based on spectral hashing with spectral rotation for dimensionality reduction and ASPE, transmitting the query trapdoor to the cloud server to obtain a search result, and subsequently verifying authenticity of the search result through the certification authority;

storing, by the cloud server, the outsourced images and the encrypted searchable index of the image owner, retrieving encrypted images according to the query trapdoor provided by the query user, returning a Top-k encrypted image structurally similar to the query image, and then embedding specific watermarks generated by the certification authority for each user into a reserved watermark embedding space of the Top-k encrypted image; and performing, by the certification authority, both user authentication and retrieval result correctness verification, realizing the user authentication by extracting and comparing specific watermark information in a suspicious image, and realizing the retrieval result correctness verification by reconstructing the Merkle tree and comparing a root hash stored by the image owner.

2. The remote sensing image security retrieval method in cloud environment according to claim 1, wherein the generating a query trapdoor comprises: expanding a query vector and splitting the query vector into two parts, and then encrypting the two parts according to two random matrices, wherein the two random matrices for encrypting the query trapdoor and the two random matrices for generating the encrypted searchable index are reciprocal quantities.

3. The remote sensing image security retrieval method in cloud environment according to claim 1, wherein the performing, by the certification authority, retrieval result correctness verification comprises:

returning, by the certification authority, all adjacent nodes along a path from root node to a leaf node for an image to be verified as evidence according to the Merkle tree of the image set; and constructing a new Merkle tree according to the image to be verified and its evidence, and comparing root hash values of the new Merkle tree with root hash values of the original Merkle tree.

4. The remote sensing image security retrieval method in cloud environment according to claim 1, wherein tracking of distribution data by the certification authority comprises:

identifying, by the image owner, suspicious images and transmitting both duplicate copies and original images to the certification authority;

locating, by the certification authority, the reserved watermark-embedded space by extracting a starting position marker, and recovering the embedded watermark information.

5. A remote sensing image security retrieval system in cloud environment, comprising a retrieval index generation and encryption module, an image encryption and watermark embedding module, a query vector generation and encryption module, a retrieval module, a retrieval result authenticity verification module and a data distribution legitimacy verification module; the remote sensing image security retrieval system in cloud environment executes the remote sensing image security retrieval method in cloud environment according to claim 1;

wherein the retrieval index generation and encryption module is configured for the image owner to extract low-dimensional image features according to a CNN model and spectral hashing with spectral rotation, and encrypt the feature vector by using ASPE to form the encrypted searchable index, and send the encrypted searchable index to the cloud server; the image encryption and watermark embedding module is configured for the image owner to encrypt the image after the image owner rearranges the reserved space according to the prediction error, and the cloud server embeds the watermark containing the identity information of the query user for data tracing; the query vector generation and encryption module is configured for the query user to extract image features according to the CNN model and spectral hashing with spectral rotation, and encrypt the query vector by using ASPE to form an encrypted query vector and send the encrypted query vector to the cloud server; the retrieval module is configured to calculate the Euclidean distance between the encrypted feature vector and the encrypted query vector, and return Top-k encrypted images in ascending order; the retrieval result authenticity verification module is configured to prevent malicious cloud servers and external attackers from forging and tampering with image content by constructing the Merkle tree; the data distribution legitimacy verification module is configured to track the distributed data through digital watermarking and prevent malicious query users from leaking the retrieval result.

6. The remote sensing image security retrieval method in cloud environment according the claim 1, further comprising:

in response to the search result being authentic, decrypting the Top-k encrypted image returned by the cloud serve to obtain a lossless original image.

7. A remote sensing image security retrieval method in cloud environment, comprising:

generating, by a key generation center, a key for an encryption algorithm;

building, by an image owner, an encrypted searchable index, comprising:

extracting, by the image owner, a set of feature vectors from an image set by using a pre-trained CNN model;

performing dimensionality reduction on the set of feature vectors via spectral hashing with spectral rotation to obtain a set of dimension-reduced feature vectors, and performing K-means++ clustering on the set of dimension-reduced feature vectors to obtain a set of cluster vectors; and expanding each cluster vector in the set of cluster vectors, followed by splitting into two parts, and encrypting the two parts obtained by splitting respectively according to two random matrices, thereby generating the encrypted searchable index;

encrypting, by the image owner, the image set to obtain an encrypted image set, comprising:

performing prediction error marking and pixel rearrangement on each image in the image set to create a watermark embedding space;

encrypting the image set by using the encryption algorithm to obtain the encrypted image set; and extracting starting position information for data embedding in each image, and then embedding a watermark containing copyright information into the watermark embedding space vacated by a corresponding encrypted image in the encrypted image set in a form of pixel replacement after a starting position;

transmitting the encrypted search image set and the encrypted image set to a cloud server;

performing, by the image owner, hash calculations on each encrypted image in the encrypted image set and a corresponding identifier (ID) to generate a Merkle tree, and sending the Merkle tree to a certification authority;

generating, based on a query image, a query trapdoor using spectral hashing with spectral rotation for dimensionality reduction and ASPE by a query user; and transmitting the query trapdoor to the cloud server to obtain a Top-k encrypted image returned by the cloud server structurally similar to the query image; wherein the Top-k encrypted image is embedded with a watermark containing identity information of the query user;

verifying, based on the Merkle tree, authenticity of the Top-k encrypted image through the certification authority; and in response to the Top-k encrypted image being authentic, decrypting the Top-k encrypted image by using the key to obtain a lossless original image.

* * * * *